United States Patent
Nagappa et al.

(10) Patent No.: US 7,871,657 B2
(45) Date of Patent: Jan. 18, 2011

(54) PROCESS FOR PREPARATION OF EXPANDED MILLET

(75) Inventors: Gurusiddappa Malleshi Nagappa, Mysore (IN); Ushakumari Rambahadur Singh, Mysore (IN)

(73) Assignee: Council of Scientific & Industrial Research, New Delhi (IN)

( * ) Notice: Subject to any disclaimer, the term of this patent is extended or adjusted under 35 U.S.C. 154(b) by 967 days.

(21) Appl. No.: 10/582,892

(22) PCT Filed: Dec. 31, 2003

(86) PCT No.: PCT/IN03/00472

§ 371 (c)(1),
(2), (4) Date: Feb. 23, 2007

(87) PCT Pub. No.: WO2005/063048

PCT Pub. Date: Jul. 14, 2005

(65) Prior Publication Data

US 2007/0160727 A1    Jul. 12, 2007

(51) Int. Cl.
*A23L 1/18*    (2006.01)

(52) U.S. Cl. ............... 426/625; 426/640; 426/445; 426/450; 426/462; 426/465; 426/508

(58) Field of Classification Search ............ 426/625, 426/640, 445, 450, 455, 456, 459, 460, 462, 426/466, 467, 469, 506, 507, 520, 508
See application file for complete search history.

(56) References Cited

U.S. PATENT DOCUMENTS

| | | | | |
|---|---|---|---|---|
| 2,181,372 A * | 11/1939 | Kellogg | | 426/449 |
| 2,289,529 A * | 7/1942 | Thompson | | 426/93 |
| 2,438,939 A * | 4/1948 | Ozai-Durrani | | 426/627 |
| 2,526,792 A * | 10/1950 | Alderman | | 426/621 |
| 2,785,070 A * | 3/1957 | Kester et al. | | 426/450 |
| 3,173,794 A * | 3/1965 | Reckon | | 426/450 |
| 3,450,540 A * | 6/1969 | Hart et al. | | 426/295 |
| 3,964,498 A * | 6/1976 | White | | 131/359 |
| 4,409,250 A * | 10/1983 | Van Hulle et al. | | 426/242 |
| 4,778,690 A | 10/1988 | Sadel, Jr. et al. | | |
| 4,847,103 A * | 7/1989 | Saita et al. | | 426/445 |
| 4,888,180 A * | 12/1989 | Wu | | 426/618 |
| 5,132,133 A * | 7/1992 | Huber et al. | | 426/241 |
| 5,520,949 A * | 5/1996 | Lewis et al. | | 426/618 |
| 6,805,888 B2 * | 10/2004 | Wu | | 426/93 |
| 2002/0071892 A1 * | 6/2002 | Malfait | | 426/445 |

(Continued)

FOREIGN PATENT DOCUMENTS

EP    0 295 774 A    12/1988

OTHER PUBLICATIONS

Database Biosis 'Online! Biosciences Information Service: Philadelphia, PA, US: 1996: Cruz-Y-Celis L P et al: "A Ready-To-Eat Breakfast . . . Sorghum": Databasse Accession No. PREV199698726474 XP002279183 Abstract & Cereal Chemistry vol. 73: No. 1: 1996: pp. 108-114.

(Continued)

*Primary Examiner*—Drew E Becker
(74) *Attorney, Agent, or Firm*—Ladas & Parry LLP

(57) ABSTRACT

The present invention relates to a process for preparation of expanded finger millet, a ready-to-eat product with versatile food uses.

11 Claims, 1 Drawing Sheet

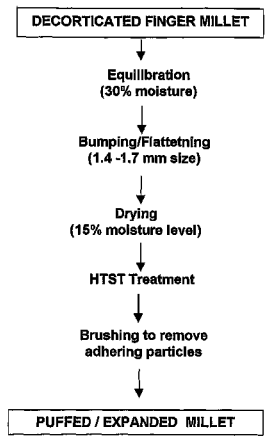

U.S. PATENT DOCUMENTS

2003/0008049 A1* 1/2003 Wilson et al. .............. 426/549
2003/0147999 A1 8/2003 Mertens et al.
2003/0185951 A1* 10/2003 Malleshi .................... 426/456

OTHER PUBLICATIONS

Database WIP Section Ch. Week 200139: Dewent Publications Ltd.: London, GB: AN 2001-368018: XP002279184 & CN 1 240 603 A (Zhongcheng Qinshifu Foodstuff Co Ltd Hun): Jan. 12, 2000: Abstract.

Vimala V et al: "Milling Techniques . . . Food Grains": Bulletin of Grain Technology, Foodgrain Technologist Research Association of India, Hapur, IN: vol. 25: No. 1: 1987: pp. 30-36: XP009002761 ISSN: 0007-4896: pp. 32-33: p. 34, Flow Diagram I: p. 35, Flow Diagram III.

* cited by examiner

```
┌─────────────────────────────────┐
│   DECORTICATED FINGER MILLET    │
└─────────────────────────────────┘
                │
                ▼
         Equilibration
        (30% moisture)
                │
                ▼
        Bumping/Flattetning
         (1.4 -1.7 mm size)
                │
                ▼
             Drying
       (15% moisture level)
                │
                ▼
          HTST Treatment
                │
                ▼
        Brushing to remove
         adhering particles
                │
                ▼
┌─────────────────────────────────┐
│    PUFFED / EXPANDED MILLET     │
└─────────────────────────────────┘
```

Fig 1

PROCESS FOR PREPARATION OF EXPANDED MILLET

FIELD OF THE INVENTION

The present invention relates to a process for preparation of expanded finger millet, a ready-to-eat product with versatile food uses.

BACKGROUND OF THE INVENTION

Finger millet or Ragi (*Eleusine coracana*) is a grain of unique nutritional qualities and technological characteristics. It is an important staple food for people belonging to low income groups in Indian subcontinent and several African countries. Millet is a good source of carbohydrates, sulphur amino acids, dietary fibre, micro-nutrients, phytochemicals and is the richest source of calcium among cereals (J. H. Hulse, E. M. Laing and O. E. Pearson, Sorghum and millets: composition and nutritive value, Academic press, New York, 1980). It is believed that among millet consumers, incidence of diabetes mellitus, cardiovascular a diseases, duodenal ulcer and other gastro-intestinal tract related disorders is relatively less (C. Gopalan Carbohydrates in diabetic diet *Bulletin of Nutrition Foundation*, India, p3, 1981) and to F. I. Tovey (Duodenal ulcer in Mysore: Characteristics and aetiological factors, *Tropical and Geographical Medicine*, 24, 107-117, 1972).

Popping of cereals, millet and some of the legumes is one of the important food processing technology followed worldwide (J. L. Malfait, Puffed food starch product and C method for making the same, US Patent Application No. US2002/0071892A1, 2002). On the other hand, puffing or preparation of expanded cereals is largely applied to rice (R. M. Huang, M. C. Chou, C. Y. Lii, Effects of the characteristics of rice and the processing conditions on the expansion ratio of dry cooked rice. *Food Science*, 25, 383-393,1998) and similar kind of products from other cereals are not generally prepared. Probably the special features of rice endosperm texture containing very low proportion of protein matrix or cell wall proteins compared to other cereals could be the reason for its puffing characteristics. The puffed or expanded rice is superior to popped rice with respect to degree of precooking, crunchiness, fiber regulation, shelf-life and sensory attributes for which reference may be made to G. Murugesan and K. R. Bhattacharya (Rheological and hydration properties of popped rice. *Journal of Texture Studies*, 20, 325-333, 1990) and R. J. MacGregor, D. M. MacGregor, A. Lueck, [Process for popping wild rice. U.S. Pat. No. 4,876,099, U.S. Ser. No. 07/223,608 (19880725), 1988]. Popping as well as puffing is a high temperature short time treatment (HTST) to grains and generally involves dropping the grains in sand, salt or air heated to about 250° C. and continuous agitation followed by separation of the popped grains from heat transfer media by sieving. Popping is also practiced using edible oil as heat transfer media, contact heat in iron or earthen pan. Both popped and puffed cereals are ready-to-eat products with crunchy texture and desirable aroma, besides, during popping the seed born microflora are destroyed and the protein gets denatured. Popped or puffed cereals could be k used as snacks as such or after seasoning with oil and spice or coating with flavoring and such other agents to improve the sensory attributes and also could be blended with processed legumes, jaggery or sugar to prepare nutritious supplementary foods for weaning children and mothers. Both puffing and popping are dry process, and have economical and technological edge over other kinds of cereal processing technologies for preparation of ready-to-eat foods.

However, drawbacks of popping process for cereals in general, and finger millet in particular, are that, the grains are mixed with sand or salt heated to about 230° C. and the popped material is separated by sieving. Fine sand or salt particles adhere to the popped grains especially in the crease portion of the expanded endosperm. This not only affects their eating qualities but also increase the silica contents. Another drawback of the hitherto known process of the popping of millets is that, the endosperm expands and gets exposed to the hot popping medium and a portion of it very often gets charred, there by reducing its economical value and sensory qualities. Another drawback of the hitherto followed process for popping millet is that, the husk or the seed coat matter of the kernel gets embedded and covered by the expanded floury endosperm and its separation is not possible by known methods. As a result, the cellulosic fiber content of the seed coat matter imparts chewy texture and dark color, and affects the organoleptic qualities and food values of the product. Since, finger millet endosperm is of floury texture attached rigidly with the seed coat, efforts to mill the popped millet to prepare debranned or dehusked grains has not been successful (N. G. Malleshi and H. S. R. Desikachar, Varietal difference in puffing quality of ragi. *Journal of Food Science and Technology*, 18, 30-32, 1981) and preparation of puffed or expanded millet was not practiced to the best of our knowledge. However, decorticated finger millet which is free from coarse seed coat matter, prepared according to the recently developed process (Malleshi N. G. A process for preparation of decorticated finger millet. Indian Patent Application No. 69/DEL/2002, 2002) has promise for puffing and diversification of puffed or expanded millet as snack, supplementary foods, specialty foods and health foods.

OBJECTS OF THE INVENTION

The main object of the invention is to prepare expanded millet similar to puffed or expanded rice which would be a precooked ready-to-eat product free from seed coat matter.

Another object of the invention is to provide a process for the preparation of expanded millet utilizing the expanded millet as snacks and adjuncts in confectionery.

SUMMARY OF THE INVENTION

Accordingly, the present invention provides a process for the preparation of expanded millet, the process comprising;
a. equilibrating millet grains to optimum moisture by adding additional water and tempering or resting in order to impart pseudo-elastic texture to decorticated millet endosperm,
b. loosening intracellular intactness of the endosperm by mechanical means without developing fissures to obtain bumped millet,
c. drying the bumped millet to optimum level for puffing,
d. grading the millet obtained in step (c) to near uniform size by screening through appropriate sieves or screens,
e. subjecting the grains to high temperature short time treatment in salt, sand or air or such other heat transfer media to prepare expanded millet.

In one embodiment of the invention, step (a) above is carried out on hydrothermally treated and decorticated finger millet.

In another embodiment of the invention, the decorticated millet is equilibrated to 15-35% moisture level and subjected to bumping or flattening to 0.7-1.0 mm thickness and 1.5 -1.6 mm diameter, mechanically or manually, without causing visible cracks.

In another embodiment of the invention, bumped millet are dried in shade or sun or in mechanical dryer to 10-20% moisture content and subjected to high temperature short time treatment in sand, salt, air or other heat transfer media heated to 200-250° C. for 15-45 seconds.

In another embodiment of the invention, step (d) is carried out to obtain millet grains with a thickness of 0.8-1.0 mm and diameter 1.5-1.6 mm.

In another embodiment of the invention, expanded millet prepared following the present process, is pre-cooked having 95-100% carbohydrate digestibility and can serve as a ready-o-eat snack, supplementary foods or such other food uses in isolation, or in combination with other edible cereals, pulses, oil seeds, fruits and vegetables including as an ingredient in confectionery.

BRIEF DESCRIPTION OF THE ACCOMPANYING DRAWING

FIG. 1 provides a flow chart for the preparation expanded finger millet according to the process of the invention.

DETAILED DESCRIPTION OF THE INVENTION

The present invention provides a process for the preparation of expanded millet comprising first subjecting finger millet which has been decorticated to a pre-processing step. The preprocessing comprises imparting pseudo-elastic texture to decorticated millet endosperm by equilibrating the millet to optimum moisture by adding additional water and tempering (or resting), loosening the intracellular intactness of the endosperm by mechanical means without developing fissures, drying the bumped millet to optimum level for puffing, and grading the pre-processed millet to near uniform size (thickness: 0.8-1.0 mm and diameter: 1.5-1.6 mm) by screening through appropriate sieves or screens. The graded grains are then subjected to high temperature short time treatment in salt, sand or air or such other heat transfer media to prepare expanded millet. Subsequently, the puffed/expanded grains are examined for their suitability for ready-to-eat health foods, snacks and as a component of confectionery products.

The hydrothermally treated and decorticated finger millet is equilibrated to 15-35% moisture level and subjected to bumping or flattening the millet to 0.7-1.0 mm thickness and 1.5-1.6 mm diameter, mechanically or manually, without causing visible cracks. The bumped grains are dried in shade or Sun or in mechanical dryer to 10-20% moisture content and subjected to high temperature short time treatment in sand, salt, air or such other heat transfer media heated to 200-250° C. for 15-45 seconds. Expanded millet prepared by the present process is pre-cooked having 95-100% carbohydrate digestibility and could serve as a ready-to-eat snack, supplementary foods or such other food uses in isolation, or in combination with other edible cereals, pulses, oil seeds, fruits and vegetables including as an ingredient in confectionery.

The novelty of the process is that a low cost and under utilized minor cereal such as finger millet could be processed to prepare high value product, that would be acceptable to the traditional as well as non-traditional millet consumers. Moreover, this is altogether a new product from finger millet which has not been prepared heretofore to our knowledge. The process permits to prepare the ready-to-eat millet which can serve as a natural source of calcium, dietary fiber, sulphur aminoacids,n micro-nutrients and antioxidants. The product prepared following the present process is also suitable for tertiary processing to prepare novelty food products of different shape, size and pallet and also as a substitute to expanded rice. Expanded millet is poised for widespread utilization in the form of diversified products.

The principle involved in the process is that the process uses decorticated millet unlike the whole seeds in traditional process. By raising the moisture level of the decorticated millet, it is made possible to induce pseudo-elasticity in the millet endosperm, which enables the grain to withstand the physical impact. The impact loosens the cell wall rigidity, modifies the endosperm texture and there by facilitates the starchy material to expand when subjected to HTST treatment. This pre-treatment to the millet overcomes the difficult of preparation of expanded products from sorghum and millets, as the endosperm of these cereals contain high proportion of pentosans compared to rice, and hydrothermal treatment to the endosperm induces rigid structure which prevents full expansion of the starchy endosperm when it is subjected to HTST treatment. However, if the grains are flattened to a large extent, rupturing of the cellular structure occurs and affect the expansion because the ruptured structure will not retain the steam during HTST treatment and therefore minimizes the expansion even though the product gets cooked. Besides, grading of the material prior to puffing helps in simultaneous expansion of all the grains uniformly within the very short span of contact time with the heat transfer media, and this prevents unnecessary charring of the grains, minimizes the loss of edible matter and also saves energy to maintain the temperature of heat transfer media during puffing.

Although, the invention is described in detail with reference to specific embodiments thereof, it will be understood that variations which are functionally equivalent are within the scope of this invention which are also are intended to fall within the scope of the invention and appended claims.

The following examples are given by way of illustration of the invention and therefore should not be construed to limit the scope of the present invention.

EXAMPLE 1

1 Kg of decorticated finger millet was sieved through sieves of 1.0 and 1.18 mm openings and graded into larger (+1.18 mm), medium (−1.0+1.18) and small size (−1.0 mm) grains. Nearly 92% of millet was of medium size and was used for preparation of expanded millet. Millet in 100 g batches was dropped in 500 g common salt of particle size 250-355 microns and heated to 230° C. in open pan. The millet and salt were mixed instantaneously with help of a ladle and mix was agitated continuously for about 30 sec or till the hissing sound subsided. Soon after that, expanded millet was separated from salt by sieving through a sieve of 2.0 mm opening. Subsequently, puffed grains were brushed to remove adhering salt. Similarly, puffing of medium grade millet was carried out using sand as heat transfer media. Apparent volume of expanded millet prepared from salt and sand media was measured and expansion ratio was calculated after equilibrating both decorticated and expanded millets (of equal weight) to 6% moisture content, as follows;

$$\text{Expansion ratio} = \frac{\text{Volume of popped grains}}{\text{Volume of decorticated grains}}$$

The expansion ratio, bulk density and color (deflection from the standard) of the puffed grains were determined by known methods (Table 1).

TABLE 1

Physical characteristics of the expanded finger millet

|  | Heat transfer media | |
| --- | --- | --- |
|  | Salt | Sand |
| Bulk Density (g/ml) | 0.251 | 0.271 |
| Expansion Ratio | 3.95 | 3.62 |
| Color (ΔE) | 42.56 | 41.80 |

EXAMPLE 2

1 Kg of decorticated finger millet was sieved through sieves of 1.0 and 1.18 mm openings and graded into larger (+1.18 mm), medium (−1.0+1.18) and small size (−1.0 mm) grains. Nearly 92% of millet was of medium size and was sprayed with predetermined quantify of water to raise the moisture content of the millet to 18% and tempered for 5 h. The millet in 100 g batches was dropped in 500 g common salt of particle size 250-355 microns and heated to 230° C. in open pan, the millet and the salt were mixed instantaneously with the help of a ladle and the mix was agitated continuously for about 30 sec or till the hissing sound subsided and soon after that the expanded millet was separated from the salt by sieving through a sieve of 2.0 mm opening. Subsequently, the puffed grains were brushed to remove the adhering salt. Similarly, puffing of the medium grade millet was carried out using sand as heat transfer media. The apparent volume of the expanded millet prepared from salt and sand media was measured and the expansion ratio was calculated after equilibrating both decorticated and expanded millets (of equal weight) to 6% moisture content, as- follows;

$$\text{Expansion ratio} = \frac{\text{Volume of popped grains}}{\text{Volume of decorticated grains}}$$

The expansion ratio, bulk density and color and nutrient contents of the puffed grains were determined (Table 2).

TABLE 2

Physical characteristics of moisture treated and puffed finger millet

|  | Heat transfer media | |
| --- | --- | --- |
|  | Salt | Sand |
| Bulk Density (g/ml) | 0.251 | 0.262 |
| Expansion Ratio | 4.45 | 4.41 |
| Color (ΔE) | 40.56 | 40.23 |

EXAMPLE 3

Five hundred grams of the decorticated millet was sprayed with predetermined quantity of additional water to raise the moisture content to 30% and kept in a closed container for about 5 h for equilibration. The equilibrated grains were subjected to bumping in a heavy duty twin roller flaker by a single stage impact (Aktiebolaget, Kvarnmaskiner, Malmo, Germany) adjusted to 1.5 mm clearance between the rolls to prepare the millet of 0.8-1 mm thickness and 1.5-1.6 mm diameter. Subsequently, the bumped grains were dried to 15% moisture content by spreading in shade and then graded by screening through sieves of 1.4 and 1.7 mm openings. The grains with 1.4-1.7 mm diameter were sorted out and used for the preparation of expanded millet. One hundred grams of the−1.4+1.7 mm sized grains were dropped in 500 g of common salt of particle size 250-355 microns heated to 230° C. in a open pan and agitated continuously for about 30 sec or till the hissing sound subsided. Immediately after that, the expanded millet was separated from the salt by sieving through a sieve of 2.0 mm opening and the puffed grains were brushed to remove the adhering salt. Similarly, puffing of graded millet was carried out in sand heated to 230° C. The apparent volume of the expanded millet was measured and the expansion ratio was calculated as, taking same quantity of both the decorticated and the expanded material, as follows;

$$\text{Expansion ratio} = \frac{\text{Volume of popped grains}}{\text{Volume of decorticated grains}}$$

The salient features of the process of preparation of decorticated finger millet is presented in FIG. 1. The expansion ratio, bulk density, color (Table 3) and nutrient contents (Table 4) of the puffed grains were determined following the known methods.

TABLE 3

The physical characteristics of bumped and puffed finger millet

|  | Heat transfer media | |
| --- | --- | --- |
|  | Salt | Sand |
| Bulk Density (g/ml) | 0.112 | 0.115 |
| Expansion Ratio | 7.84 | 7.8 |
| Color (ΔE) | 37.5 | 37.5 |

TABLE 4

Nutrient composition of decorticated and puffed finger millet (g/100 g)

| Nutrient | Decorticated | Puffed |
| --- | --- | --- |
| Moisture | 10.2 | 4.6 |
| Ether extractives | 1.0 | 1.0 |
| Protein | 6.3 | 5.4 |
| Dietary fiber | 14.7 | 15.0 |
| Minerals | 0.40 | 0.50 |
| Calcium (mg %) | 180 | 180 |
| Swelling power | 570 | 500 |
| Solubility (%) | 4.3 | 5.4 |
| Bulk density (g/ml) | 0.825 | 0.1124 |
| Expansion ratio | — | 7.85 |

EXAMPLE 4

Five hundred grams of the decorticated millet was sprayed with predetermined quantity of additional water to raise the moisture content to 30% and kept in a closed container for about 5 h for equilibration. The equilibrated grains were subjected to bumping in a heavy duty twin roller flaker by a single stage impact (Aktiebolaget, Kvarnmaskiner, Malmo, Germany) adjusted to 1.5 mm clearance between the rolls to prepare the millet of 0.8 0-1 mm thickness and 1.5-1.6 mm diameter. Subsequently, the bumped grains were dried to 15% moisture content by spreading in shade and then graded by screening through sieves of 1.4 and 1.7 mm openings. The grains with 1.4-1.7 mm diameter were sorted out and used for the preparation of expanded millet. One hundred grams of the −1.4+1.7 mm sized grains were dropped in 500 g of common salt of particle size 250-355 microns heated to 230° C. in a open pan and agitated continuously for about 30 sec or till the hissing sound subsided. Immediately after that, the expanded millet was separated from the salt by sieving through a sieve of 2.0 mm opening and the puffed grains were brushed to remove the adhering salt. The expanded millet was smeared with a thin layer of vegetable oil in a coating machine and dusted uniformly with banana flavored sugar powder. The coated millet had crispy texture and highly acceptable taste and aroma. Simultaneously, 180 g of expanded millet was mixed with chocolate mass containing 600 g cooking chocolate and 280 g of white chocolate heated to 70° C. and cooled to 40° C. The mass containing expanded millet was transferred to chocolate moulds and left in refrigerator for 48 h after that wrapped in aluminum foils and cured at ambient conditions for 1 week. The expanded millet retained shape, size and crispy texture in chocolate and the product exhibited very high acceptability by all age groups.

The main advantage of the present invention is that, by the process, it is possible to transform decorticated millet to fully cooked ready-to-eat product with versatile food uses by simple dry heat treatment which otherwise is not edible as such and needs cooking in water similar to rice. The process permits utilization of decorticated millet prepared from different cultivars irrespective of chemical composition, seed coat color, size and shape and pre-harvest condition. Preparing expanded millet overcomes monotonous use of millet in form of cooked grains and provides easy and convenient avenues for its diversification and value addition.

Since popping is a dry process, it needs minimum energy inputs compared to other kinds of cereal processing methodologies to prepare ready-to-eat products. Moreover, the grains get freed from the seed born microflora during processing without any kinds of chemical or such other treatment. The expanded millet being largely spherical in shape and is of smooth surface, adherence of the heat transfer media namely sand or salt is negligible, and if a small portion is adhered that can be separated easily by simple brushing or aspiration. The expanded millet is a rich source of pre-gelatinized starch and other carbohydrates and finds its utilization as a thickener in soups and such other foods, and also as a base for ready-to-eat supplementary foods, snacks, confectionery, sweet and savory products. The special features of the expanded millet is that it retains crispness even when it is used as a component of cocoa based confectionery. The millet being rich source of calcium and other micro-nutrients, the product prepared, following the present process could serve as a natural source of calcium and also as a base in calcium enriched food formulation for special physiological situation such as osteoporosis.

The process of puffing is followed traditionally in different parts of the country and could be exercised at household level with the available gadgets and utensils and also at industrial level adopting gun puffing or such other modern cereal processing technologies. Since the product has high carbohydrate digestibility it can be used as an adjunct in brewing as well.

We claim:

1. A process for the preparation of expanded millet or sorghum, the process comprising;
   a. equilibrating hydrothermally treated and decorticated millet or sorghum grains to a moisture content of 15-35% by adding additional water and tempering or resting in order to impart pseudo-elastic texture to decorticated millet or sorghum endosperm,
   b. loosening intracellular intactness of the endosperm by mechanical means without developing fissures to obtain bumped millet or sorghum,
   c. drying the bumped millet or sorghum to a moisture level of 10-20%,
   d. grading the millet or sorghum obtained in step (c) to obtain millet or sorghum grains with a thickness of 0.8-1.0 mm and diameter 1.5-1.6 mm by screening through appropriate sieves or screens,
   e. subjecting the grains to high temperature short time treatment at 200-250° C. for 15-45 seconds in salt, sand or air or such other heat transfer media to prepare expanded millet or sorghum.

2. A process as claimed in claim 1 wherein step (a) above is carried out on hydrothermally treated and decorticated finger millet.

3. A process as claimed in claim 1 wherein the expanded millet or sorghum prepared is pre-cooked to provide 95-100% carbohydrate digestibility.

4. A process as claimed in claim 1 wherein the millet is selected from the group consisting of finger millet, pearl millet, and minor millets containing fully or partially gelatinized starch.

5. A process as claimed in claim 1 wherein the bumped millet or sorghum are subjected to high temperature short time treatment in sand or salt, and the sand or salt sieved off immediately.

6. A process as claimed in claim 1 wherein the expanded millet or sorghum is freed from adhering heat transfer media by brushing or aspiration.

7. A process as claimed in claim 1 wherein the expanded millet or sorghum obtained is free from seed born microflora.

8. A process as claimed in claim 1 wherein the expansion ratio of the expanded millet or sorghum is in the range from 5 to 8 times of its original volume and is effected without loss of the millet's or sorghum's original spherical shape and with, a crispy texture.

9. A process as claimed in claim 1 wherein the expanded millet or sorghum contains 4-8% protein, 1-1.5% fat, 13-16% dietary fiber with 98% carbohydrate digestibility.

10. A process as claimed in claim 1 wherein the expanded millet or sorghum is coated with an edible fruit or edible vegetable powder, or edible agent selected from the group consisting of sugar, malt powder, malt extract, and edible colors.

11. A process as clamed in claim 1 wherein the grain is sorghum.

* * * * *